US010059792B2

United States Patent
Hsieh et al.

(10) Patent No.: US 10,059,792 B2
(45) Date of Patent: *Aug. 28, 2018

(54) PHOSPHOR-CONTAINING PHENOL FORMALDEHYDE RESIN COMPOUND AND FLAME-RETARDANT EPOXY RESIN HARDENER MADE FROM THEREOF

(71) Applicant: Jiangsu Yoke Technology Co., Ltd, Jiangsu Province (CN)

(72) Inventors: Tung-Ying Hsieh, Jiangsu (CN); Qi Shen, Jiangsu (CN); Chia-Ming Chang, Jiangsu (CN)

(73) Assignee: Jiangsu Yoke Technology Co., Ltd, Jiangsu Province (CN)

( * ) Notice: Subject to any disclaimer, the term of this patent is extended or adjusted under 35 U.S.C. 154(b) by 313 days.

This patent is subject to a terminal disclaimer.

(21) Appl. No.: 14/821,783

(22) Filed: Aug. 9, 2015

(65) Prior Publication Data

US 2016/0046753 A1  Feb. 18, 2016

(30) Foreign Application Priority Data

Aug. 15, 2014  (CN) .......................... 2014 1 0403470

(51) Int. Cl.
| | |
|---|---|
| C08G 8/10 | (2006.01) |
| C08K 5/5313 | (2006.01) |
| C08G 8/28 | (2006.01) |
| C08L 63/04 | (2006.01) |
| C08L 61/14 | (2006.01) |

(52) U.S. Cl.
CPC ................. *C08G 8/10* (2013.01); *C08G 8/28* (2013.01); *C08K 5/5313* (2013.01); *C08L 61/14* (2013.01); *C08L 63/04* (2013.01); *C08L 2201/02* (2013.01)

(58) Field of Classification Search
None
See application file for complete search history.

(56) References Cited

U.S. PATENT DOCUMENTS

2003/0120021 A1    6/2003  Wang et al.

FOREIGN PATENT DOCUMENTS

| | | |
|---|---|---|
| CN | 101195676 A | 6/2008 |
| CN | 101928372 A | 12/2010 |
| CN | 103382242 A | 11/2013 |
| DE | 4308184 A1 | 9/1994 |
| DE | 4308185 A1 | 9/1994 |
| DE | 4308187 A1 | 9/1994 |
| EP | 0384939 A1 | 9/1990 |
| EP | 0384940 A1 | 9/1990 |
| EP | 0408990 A2 | 1/1991 |
| JP | 05-230439 A | 7/1993 |
| JP | 2002-053633 A | 2/2002 |
| JP | 2002053633 A * | 2/2002 |
| JP | 2003105058 A | 4/2003 |
| JP | 2011157433 A * | 8/2011 |
| JP | 2014-516973 A | 7/2014 |
| JP | 5564100 B2 | 7/2014 |
| JP | 2015-007232 A | 1/2015 |
| TW | 201109371 A | 3/2011 |
| WO | 9607685 A1 | 3/1996 |
| WO | 9607686 A1 | 3/1996 |
| WO | 2012161926 A2 | 11/2012 |
| WO | WO 2012161926 A2 * | 11/2012 ........ C07F 9/657172 |
| WO | 2013145950 A1 | 10/2013 |

* cited by examiner

*Primary Examiner* — Robert S Loewe
*Assistant Examiner* — Ha S Nguyen
(74) *Attorney, Agent, or Firm* — CKC & Partners Co., Ltd.

(57) ABSTRACT

The present disclosure provides a phosphor-containing phenol formaldehyde resin compound having a general formula (I):

$$\left[\begin{array}{c}\text{OH}\\(R)_q\\\diagup\diagdown\\|\ \ \ |\\\diagdown\diagup\\(X)_p\end{array}-Z-\begin{array}{c}\text{OH}\\(R)_q\\\diagup\diagdown\\|\ \ \ |\\\diagdown\diagup\\(X)_p\end{array}\right]_a\left[-Y-\begin{array}{c}\text{OH}\\(R)_q\\\diagup\diagdown\\|\ \ \ |\\\diagdown\diagup\\(X)_p\end{array}\right]_b \quad (I)$$

The compound is formed of a phenol formaldehyde resin and an aromatic phosphate compound by performing a condensation reaction, which may be used as a curing agent of an epoxy resin. The phenol formaldehyde resin is formed of a phenolic compound, a bisphenol compound and formaldehyde. The present disclosure further provides a phosphor-containing phenol formaldehyde resin cured material which is formed of the phosphor-containing phenol formaldehyde resin compound and an epoxy resin under a high temperature. The phosphor-containing phenol formaldehyde resin compound is added separately or mixed with an epoxy resin curing agent.

12 Claims, No Drawings

PHOSPHOR-CONTAINING PHENOL FORMALDEHYDE RESIN COMPOUND AND FLAME-RETARDANT EPOXY RESIN HARDENER MADE FROM THEREOF

BACKGROUND

This application claims priority to China Application Serial Number 201410403470.2, filed Aug. 15, 2014, which is incorporated herein by reference.

Field of Invention

The present disclosure relates to a phosphor-containing phenol-formaldehyde resin compound and the preparation method thereof, and the use of the compound to react with the epoxy group of an epoxy resin to obtain an environmentally-friendly and high performing halogen-free cured flame-retardant epoxy resin.

Description of Related Art

The chemical structure of epoxy resin features its desirable properties, e.g., reactivity, toughness, flexibility, good mechanical properties, electrical properties, dimensional stability, and superior bonding properties for different substrates. The cured epoxy resin can not only maintain the original features of the substrate, but also further block out water, gas and chemicals, and it is also lightweight and low cost. Therefore, epoxy resin is widely used in electronics and aerospace industries, especially in the field of semiconductor packaging material, printed circuit board substrate material and so on. However, when the epoxy resin is applied to a printed circuit board, there is a lack of flame retarding. In the past, halogen based flame-retardant was added to the epoxy resin to meet the flame-retarding requirements. The halogen based flame-retardant will produce dioxin, benzofuran and other irritating and corrosive harmful gases when burnt, and the small molecules of the flame-retardant often cause a reduction in the mechanical properties and will photodecompose, thus causing material deterioration. At the same time there will be migration and volatility issues, resulting in a reduction of the material performance and the flame-retarding effect is not ideal. Therefore, the use of organic phosphorus compound flame-retardants in thermal cured epoxy resin compositions instead of halogenated flame-retardants is constantly emerging, for example, in patents such as EP A 0384939, EP A 0384940, EP A 0408990, DE A 4308184, DE A 4308185, DE A 4308187, WO A 96/07685, and WO A 96/07686, In addition, for the printed circuit laminates, with the rise of environmental awareness, the current international norms require lead free processes, therefore the processing of the substrate are now more demanding, especially regarding the vitrification temperature (Tg) of the material and the heat resistance of the substrate in a tin furnace has become an important issue that researchers in this field must overcome.

SUMMARY

The present disclosure provides a new type of phosphors-containing phenol-formaldehyde resin c pound that can be used for curing epoxy resins, and gives a high flame-retarding performance. The introduction of environment-friendly organic phosphorus group can not only maintain the original excellent properties of epoxy resins, but also meet the high flame-retarding requirements, and have the ability to improve the glass transition temperature (Tg), heat resistance and other characteristics of the material so that the curing system can be successfully applied to the electronic materials field which are light, thin, small and precise.

One aspect of the present disclosure is to provide a new type of phosphor-containing flame retardant phenol-formaldehyde resin compound having a general formula represented by Formula (I):

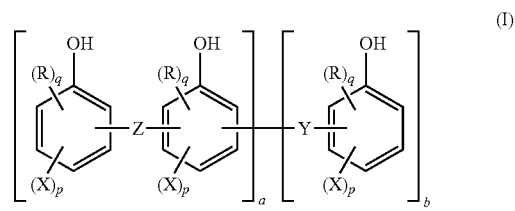

wherein, Y is —$CH_2$— or —$CH_2$—O—$CH_2$—, and Y in different units are the same or different;

Z is unsubstituted, —$CH_2$—, —O—, —S—, —$S(O)_2$— or

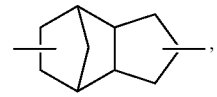

and Z in different units are the same or different;

R is H, a C1-C10 alkyl group, a C6-C18 aromatic group,

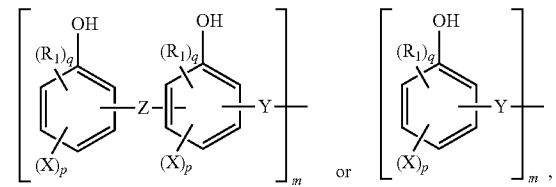

$R_1$ is H a C1-C10 alkyl group, a C6-C18 aromatic group, and $R_1$ in different units are the same or different, and R in different units are the same or different;

p is 0-2; q is 0-3; a is an integer greater than or equal to 1; b is an integer greater than or equal to 0; and m is 0-6; and X is

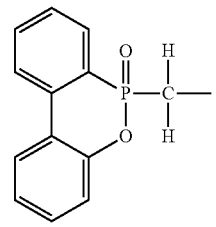

In various embodiments of the present disclosure, a chemical formula of the phosphor-containing flame retardant phenol-formaldehyde resin compound may be

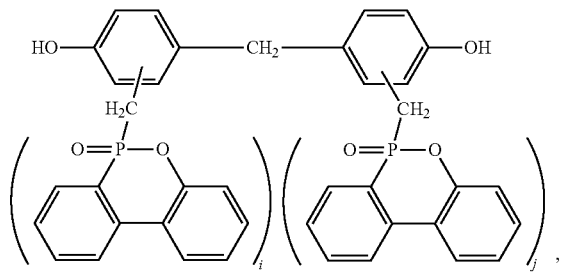

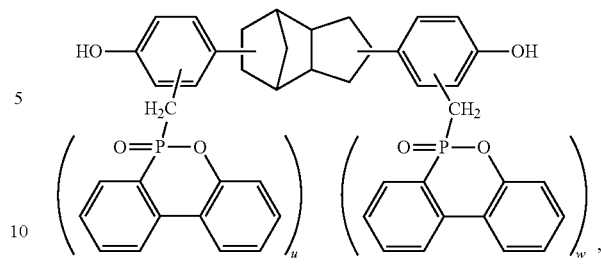

wherein u is 0-2; is w is 0-2; a sum of u and w is an integer greater than or equal to 1.

The above mentioned phosphor-containing flame retarding phenol-formaldehyde resin compound has a suitable reactivity, wide range of lamination processing period, high glass transition temperature, excellent heat resistance, low water absorption, good electrical properties and can be used as an epoxy resin hardener. By reacting the epoxy group of the epoxy resin with the phenolic hydroxyl group of the compound, an environmentally-friendly halogen-free cured flame retarding epoxy resin may be formed, which can be used in packaging materials for integrated circuit boards and semiconductors.

wherein i is 0-2; j is 0-2; a sum of i and j is an integer greater than or equal to 1

In various embodiments of the present disclosure, a chemical formula of the phosphor-containing flame retardant phenol-formaldehyde resin compound may be

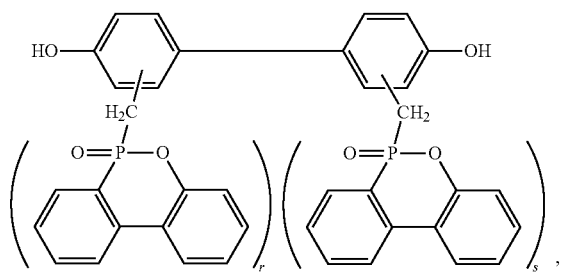

The method for preparing phosphor-containing (flame retarding) phenol-formaldehyde resin compound is making a novolac from a phenol compound, a bisphenol compound and formaldehyde, and then mixing the novolac with an aromatic phosphate ester, such as DOPA (9, 10-dihydro-9-oxa-10-phosphaphenanthrene-10-oxide), to undergo condensation and polymerization.

The phenol compound used in the preparation method of the present disclosure may be phenol, o-cresol, m-cresol, p-cresol, o-phenylphenoi, m-phenylphenol, p-phenylphenol, 2,6-dimethylphenol, 2,4-dimethylphenol or a combination thereof. The bisphenol compound may be biphenol, bisphenol F, bisphenol A, p-thiobisphenol, bisphenol S, dicycio-pentadiene-phenol resin or a combination thereof.

In the chemical structure, since the phosphor-containing phenol-formaldehyde resin compound has a bisphenol compound with excellent heat resistance, high glass transition temperature (Tg), low water absorption and good electrical properties, examples of the bisphenol compound include biphenol, bisphenol F, bisphenol A, bisphenol S, and dicyclopentadiene-phenol resin, etc. Therefore, the phosphor-containing phenol-formaldehyde resin compound can be applied to the electronic material fields which are light, thin, small and precise.

wherein r is 0-2; s is 0-2; a sum of r and s is an integer greater than or equal to 1.

In various embodiments of the present disclosure, a chemical formula of the phosphor-containing flame retardant phenol-formaldehyde resin compound may be

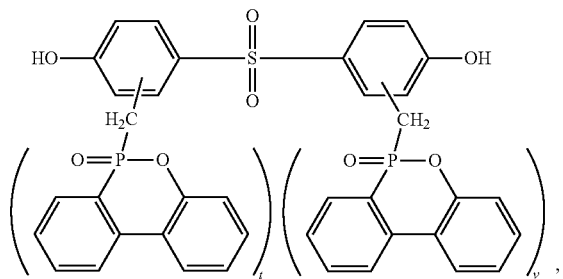

The present disclosure also provides a cured flame retarding epoxy resin, which is prepared by reacting the above-mentioned pho phorous-containing flame retarding phenol-formaldehyde novolac, which can be used alone or mixed with an epoxy resin hardener, with epoxy resin at high temperatures. The halogen-free flame retarding epoxy resin composition was impregnated in glass fiber, and then after a thermal curing process, forms a flame retarding copper-clad laminate, which can be used as a packaging material in integrated circuit boards and semiconductors. Therefore, the cured flame retarding epoxy resin that is formed can be used as a resin substrate of a printed circuit board and semiconductor packaging material.

wherein t is 0-2; v is 0-2; a sum of t and v is an integer greater than or equal to 1.

In various embodiments of the present disclosure, a chemical' formula of the phosphor-containing flame retardant phenol-formaldehyde resin compound may be The epoxy resin hardener mentioned above can be selected from the group consisting of phenol-formaldehyde novolac, cresol-formaldehyde novolac, bisphenol A phenol-formaldehyde novolac, dicyandiamide, methylenedianiline, diaminodiphenyl sulfone, dicyclopentadiene-phenol resin and a combination thereof.

The above mentioned epoxy resin refers to a difunctional-group epoxy resin or a polyfunctional-group epoxy resin, for example, bisphenol A epoxy resin, bisphenol F epoxy resin, bisphenol S epoxy resin, biphenol epoxy resin, phenol epoxy resin, cresol epoxy resin, bisphenol A epoxy resin, dicyclopentadiene-phenol epoxy resin and a combination thereof.

In the cured phosphorous-containing flame retarding epoxy resin of the present disclosure, the epoxy resin and the hardener are used in same equivalents, and prepared by a curing reaction at a temperature higher than 150° C.

In order to meet a UL94 V-0 flame-retardant grade, in the cured phosphor-containing flame retarding epoxy resin (epoxy resin+phosphor-containing hardener+other additives) of the present disclosure, although the formulation of the compositions and the specific structure of each component have many variations, as long as the phosphorus content of the final cured product is controlled to be within 0.5 to 10% mass range it is acceptable.

To carry out the reaction effectively, the cured phosphor-containing flame retarding epoxy resin of the present disclosure can be carried out in the presence of a curing accelerator, a curing accelerator can be used in a range of 0.01 to 2.5 weight percent of the total weight of the epoxy resin and the hardener, and the suitable curing accelerators include imidazole-based compounds, for example, 2-methylimidazole (2-MI), 2-phenylimidazole (2-PI) or 2-ethyl-4-methylimidazole (2E4MZ) and the like.

These and other features, aspects, and advantages of the present invention will become better understood with reference to the following description and appended claims.

It is to be understood that both the foregoing general description and the following detailed description are by examples, and are intended to provide further explanation of the invention as claimed.

DETAILED DESCRIPTION

Reference will now be made in detail to the present embodiments of the invention. Wherever possible, the same reference numbers are used in the description to refer to the same or like parts.

1. Preparation of the Phosphorous Containing Phenol-Formaldehyde Novolac Compound Embodiment 1

376 grams of biphenol, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 85° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180 within a 2-hour period, when the temperature reached 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-1 (phosphorous-containing phenol-formaldehyde novolac compound) is then obtained.

Embodiment 2

37 grams of phenol, 337 grams of biphenol, 648 grams of formaldehyde aqueous solution (37% mass concentration) and 24 grams of sodium hydroxide were added to a reactor, the mixing is then started and the temperature is heated to 50° C. and maintained for 3 hours. The temperature then raised to 85° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120 the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-2 is then obtained.

Embodiment 3

520 grams of bisphenol S, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 85° C, after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C., within a 2-hour period, when the temperature reached 130° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-3 is then obtained.

Embodiment 4

59 grams of phenol, 461 grams of bisphenol S, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 85° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-4 is then obtained.

Embodiment 5

490 grams of bisphenol F, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120° C., the pressure of the reaction system as reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-5 is then obtained.

Embodiment 6

49 grams of phenol, 441 grams of bisphenol F, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 175° C. within a 2-hour period, when the temperature reached 120° C., the pressure of the reaction system was reduced to ensure that the n-butanol can be discharged out of the reaction system in time. The temperature is maintained at 175° C. for 2 hours, the reaction temperature is then lowered to 140° C. about 900 grams of propylene glycol methyl ether were added and mixed for another 0.5 hours, a phosphor-based hardener P-6 is then obtained.

Embodiment 7

640 grams of dicyclopentadiene-phenol resin, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120° C. the pressure of the reaction system was reduced to ensure that the n-butanol can be discharged out of the reaction system in time. The temperature is maintained at 180° C. for 2 hours, the reaction temperature is then lowered to 130° C. about 900 grams of propylene glycol methyl ether were added and mixed for another 0.5 hours, a phosphor-based hardener P-7 is then obtained.

Embodiment 8

64 grams of phenol, 576 grams of dicyclopentadiene-phenol resin, 648 grams of formaldehyde aqueous solution (37% mass concentration) and 24 grams of sodium hydroxide were added to a reactor, the mixing is then started and the temperature is heated to 50° C. and maintained for 3 hours. The temperature is then raised to 65 after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (,10-dihydro-9-oxa-10-phosphaphenanthrene-10-oxide) were added to the intermediate product, the reaction temperature was raised from 80° C. to 175° C. within a 2-hour period, when the temperature reached 120° C., the pressure of the reaction system was reduced to ensure that the n-butanol can be discharged out of the reaction system in time. The temperature is maintained at 175° C. for 2 hours, the reaction temperature is then lowered to 140° C., about 900 grams of propylene glycol methyl ether were added and mixed for another 0.5 hours, a phosphor-based hardener P-8 is then obtained.

Embodiment 9

257 grams of biphenol, 257 grams of bisphenol F, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 175° C. within a 2-hour period, when the temperature reached 120° C., the pressure of the reaction system was reduced to ensure that the n-butanol can be discharged out of the reaction system in time. The temperature is maintained at 175° C. for 2 hours, the reaction temperature is then lowered to 130° C., about 900 grams of propylene glycol methyl ether were added and mixed for another 0.5 hours, a phosphor-based hardener P-9 is then obtained.

Embodiment 10

267 grams of phenol S, 267 grams of bisphenal F, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120° C., the pressure of the reaction system as reduced to ensure that the n-butanol can be discharged out of the reaction system in time. The temperature is maintained at 180° C. for 1 hour, the reaction temperature is then lowered to 135° C., about 900 grams of propylene glycol methyl ether were added and mixed for another 0.5 hours, a phosphor-based hardener P-10 is then obtained.

COMPARATIVE EXAMPLE 1

470 grams of phenol. 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C., after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-11 is then obtained.

COMPARATIVE EXAMPLE 2

570 grams of bisphenol A, 648 grams of formaldehyde aqueous solution (37% mass concentration) and 24 grams of sodium hydroxide were added to a reactor, the mixing is then started and the temperature is heated to 40° C. and maintained for 3 hours. The temperature is then raised to 65° C. after maintaining the temperature for 3 hours, 1480 grams of n-butanol were added and refluxed for 12 hours. The reaction temperature is then lowered to 55-60° C., and distilled under a reduced pressure to remove about 1000 grams of n-butanol, and an intermediate product is obtained.

1080 grams of DOPO (9,10-dihydro-9-oxa-10-phosphaphenanthrene-10-oxide) were added to the intermediate product, the reaction temperature was raised from 80° C. to 180° C. within a 2-hour period, when the temperature reached 120° C., the pressure of the reaction system was reduced to ensure that the n-butanol can be discharged out of the reaction system in time. The temperature is maintained at 180° C. for 1 hour, the reaction temperature is then lowered to 130° C., about 900 grams of propylene glycol methyl ether were added and mixed for another 0.5 hours, a phosphor-based hardener P-12 is then obtained.

The method for preparing phosphor-containing flame retarding phenol-formaldehyde resin compound is making a novolac from a phenol compound, a bisphenol compound and formaldehyde, and then mixing the novolac with an aromatic phosphate ester, such as DOPO (9,10-dihydro-9-oxa-10-phosphaphenanthrene-10-oxide), to undergo condensation and polymerization.

The phenol compound used in the preparation method of the present disclosure may be phenol, o-cresol, m-cresol, p-cresol, o-phenylphenol, m-phenylphenol, p-phenylphenol, 2,6-dimethylphenol, 2,4-dimethylphenol or a combination thereof. The bisphenol compound may be biphenol, bisphenol F, bisphenol A, p-thiobisphenol, bisphenol S, dicyclopentadiene-phenol resin or a combination thereof.

The phenol-based compounds and/or the bisphenol-based compounds used in embodiments 1-10 and comparative examples 1-2 are listed in table 1:

TABLE 1

| | phenol-based compound | bisphenol-based compound | product |
|---|---|---|---|
| embodiment 1 | | biphenol | phosphor-based hardener P-1 |
| embodiment 2 | phenol | biphenol | phosphor-based hardener P-2 |
| embodiment 3 | | bisphenol S | phosphor-based hardener P-3 |
| embodiment 4 | phenol | bisphenol S | phosphor-based hardener P-4 |
| embodiment 5 | | bisphenol F | phosphor-based hardener P-5 |
| embodiment 6 | phenol | bisphenol F | phosphor-based hardener P-6 |
| embodiment 7 | | dicyclopentadiene-phenol resin | phosphor-based hardener P-7 |
| embodiment 8 | phenol | dicyclopentadiene-phenol resin | phosphor-based hardener P-8 |
| embodiment 9 | | biphenol + bisphenol F | phosphor-based hardener P-9 |
| embodiment 10 | | bisphenol S + bisphenol F | phosphor-based hardener P-10 |
| comparative example 1 | phenol | | phosphor-based hardener P-11 |
| comparative example 2 | | bisphenol A | phosphor-based hardener P-12 |

2. Complete Curing of Epoxy Resin with Phosphor-Containing Hardener

Embodiments 11-20

Using different phosphor-containing hardeners (P-1 to P-10) as hardeners for bisphenol A novolac epoxy resin (BNE). The bisphenol A novolac epoxy resin (BNE) is mixed with the hardeners (P-1 to P-10) homogeneously, the equivalent ratio the epoxy group and the phenol group is 1:1, and 0.5 PHR of 2-phenylimidazole of the total weight of the hardener and epoxy resin was added as a curing accelerator, grounded into a powder in a mortar and mixed uniformly, and then the mold was filled with this powder, heated at a temperature of 150° C. and at a pressure of 50 kg/cm$^2$ for 1 hour, then heated at 170° C. for 2 hours, and then heated at 200° C. for 3 hours to obtain the cured product.

COMPARATIVE EXAMPLE 3

Using the phosphorous-containing hardener in comparative example 1 (P-11) as the hardener for bisphenol A novolac epoxy resin (BNE). The bisphenol A novolac epoxy resin (BNE) is mixed with the hardener (P-11) homogeneously, the equivalent ratio the epoxy group and the phenol group is 1:1, and 0.5 PHR of 2-phenylimidazole of the total weight of the hardener and epoxy resin was added as a curing accelerator, grounded into a powder in a mortar and mixed uniformly, and then the mold was filled with this powder, heated at a temperature of 150° C. and at a pressure of 50 kg/cm$^2$ for 1 hour, then heated at 170° C. for 2 hours, and then heated at 200° C. for 3 hours to obtain the cured product.

COMPARATIVE EXAMPLE 4

Using the phosphorous-containing hardener in comparative example 2 (P-12) as the hardener for bisphenol A novolac epoxy resin (BNE). The bisphenol A novolac epoxy resin (BNE) is mixed with the hardener (P-12) homogeneously, the equivalent ratio the epoxy group and the phenol group is 1:1, and 0.5 PHR of 2-phenylimidazole of the total weight of the hardener and epoxy resin was added as a curing accelerator, grounded into a powder in a mortar and mixed uniformly, and then the mold was filled with this powder, heated at a temperature of 150° C. and at a pressure of 50 kg/cm² for 1 hour, then heated at 170° C. for 2 hours, and then heated at 200° C. for 3 hours to obtain the cured product.

Embodiments 21-30

The phosphorous-containing hardener (P-1 to P-10), bisphenol A novolac epoxy resin (BNE), cresol formaldehyde novolac epoxy resin (CNE), and phenol novolac epoxy (PNE) are in weight proportions shown in table 4, and aluminum hydroxide, silicon dioxide, and an imidazole-based curing accelerator are mixed homogeneously in a suitable solvent, impregnated with glass fiber cloth in a impregnation machine, after heating at 170° C. for 150 seconds, a small heat press was used to cut at 185° C., 25 kg/cm² and cure for 2 hours to obtain a halogen free copper clad laminate.

COMPARAYIVE EXAMPLE 5-6

The phosphorous-containing hardener (P-11 to P-12), bisphenol A novolac epoxy resin (BNE), cresol formaldehyde novolac epoxy resin (CNE), and phenol novolac epoxy (PNE) are in weight proportions shown in table 4, and aluminum hydroxide, silicon dioxide, and an imidazole-based curing accelerator are mixed homogeneously in a suitable solvent, impregnated with glass fiber cloth in a impregnation machine, after heating at 170° C. for 150 seconds, a small heat press was used to cut at 185° C., 25 kg/cm² and cure for 2 hours to obtain a halogen free copper clad laminate.

Test Description:

(1) Varnish gel time (sec)

0.3 ml of resin varnish was placed on a 170° C. hot plate, and the gel time was measured.

(2) Glass Transition Temperature (° C.)

A heating rate of 20° C./min was used in differential scanning calorimetry (DSC) tests.

(3) Flame-Retarding:

Test pieces were cut into 0.5 in×4.7 in rectangles, a blue flame with a flame height of 2 cm was used to burn for 10 seconds and then removed, after burning twice, the flame is removed and the self-extinguishing time is recorded.

(4) Water Absorption Rate (%):

The sample was heated in a pressure boiler at 120° C. and 2 atm for 30 minutes.

(5) Dielectric Loss (1 GHz):

The test piece was cut into 5×5 squares, and the thickness were measured by measuring three points and then sandwiched into a dielectric analysis instrument for measurements, after completion, the mean value was recorded.

(6) Dielectric Constant (1 GHz):

The substrate after etching was cut into 5 cm² square test pieces, after baking at 105° C. for 2 hours in the oven, the substrate was removed and the thickness were measured by measuring three points. Then the test piece was sandwiched into a dielectric analysis instrument, after measuring three points, the mean value was recorded.

Although the present invention has been described in considerable detail with reference to certain embodiments thereof, other embodiments are possible. Therefore, the spirit and scope of the appended claims should not be limited to the description of the embodiments contained herein.

Table 2 is a comparison of the glass transition temperature (Tg) of the hardeners; Table 3 is an analysis of the thermal cracking of the hardeners; Table 4 gives the test results of the copper-clad laminate substrates.)

TABLE 2 glass transition temperature of the cured products:

| Sample | Hardener | glass transition temperature (Tg, ° C.) |
|---|---|---|
| embodiment 11 | P-1 | 178 |
| embodiment 12 | P-2 | 176 |
| embodiment 13 | P-3 | 189 |
| embodiment 14 | P-4 | 186 |
| embodiment 15 | P-5 | 176 |
| embodiment 16 | P-6 | 174 |
| embodiment 17 | P-7 | 180 |
| embodiment 18 | P-8 | 178 |
| embodiment 19 | P-9 | 177 |
| embodiment 20 | P-10 | 180 |
| comparative example 3 | P-11 | 161 |
| comparative example 4 | P-12 | 176 |

TABLE 3 analysis of the thermal cracking of the cured product:

| Sample | Hardener | Thermal cracking (5% weight loss) Temp. (° C.) |
|---|---|---|
| embodiment 11 | P-1 | 386 |
| embodiment 12 | P-2 | 381 |
| embodiment 13 | P-3 | 425 |
| embodiment 14 | P-4 | 425 |
| embodiment 15 | P-5 | 380 |
| embodiment 16 | P-6 | 375 |
| embodiment 17 | P-7 | 388 |
| embodiment 18 | P-8 | 385 |
| embodiment 19 | P-9 | 388 |
| embodiment 20 | P-10 | 398 |
| comparative example 3 | P-11 | 338 |
| comparative example 4 | P-12 | 353 |

TABLE 4 resin composition formulation and physical properties:

| | Embodiments | | | | | | | | | | Comparative examples | |
|---|---|---|---|---|---|---|---|---|---|---|---|---|
| | 21 | 22 | 23 | 24 | 25 | 26 | 27 | 28 | 29 | 30 | 5 | 6 |
| BNE | 35 | 35 | 20 | 20 | 30 | 30 | 30 | 30 | 25 | 20 | 35 | 35 |
| PNE | 10 | 10 | 10 | 10 | 0 | 0 | 0 | 0 | 5 | 10 | 10 | 10 |
| CNE | 55 | 55 | 70 | 70 | 70 | 70 | 70 | 70 | 70 | 70 | 55 | 55 |
| P-1 | 18 | | | | | | | | | | | |
| P-2 | | 18 | | | | | | | | | | |
| P-3 | | | 16 | | | | | | | | | |
| P-4 | | | | 16 | | | | | | | | |
| P-5 | | | | | | | | | | | | |
| P-6 | | | | | 17 | 17 | | | | | | |

TABLE 4-continued resin composition formulation and physical properties:

| | Embodiments | | | | | | | | | | Comparative examples | |
|---|---|---|---|---|---|---|---|---|---|---|---|---|
| | 21 | 22 | 23 | 24 | 25 | 26 | 27 | 28 | 29 | 30 | 5 | 6 |
| P-7 | | | | | | | 22 | 22 | | | | |
| P-8 | | | | | | | | | | | | |
| P-9 | | | | | | | | | 19 | | | |
| P-10 | | | | | | | | | | 17 | | |
| P-11 | | | | | | | | | | | 17 | |
| P-12 | | | | | | | | | | | | 17 |
| Flame retardant (Aluminum hydroxide) | 20 | 20 | 20 | 20 | 20 | 20 | 20 | 20 | 20 | 20 | 20 | 20 |
| Filler (silicon dioxide) | 10 | 10 | 10 | 10 | 10 | 10 | 10 | 10 | 10 | 10 | 10 | 10 |
| Accelerator 2MI (PHR) | | | 1.2 | 1.2 | | | | | | 1.1 | | |
| Accelerator 2PI (PHR) | 0.2 | 0.2 | | | 0.6 | 0.6 | 0.5 | 0.5 | 0.7 | | 0.2 | 0.2 |
| Phosphorus content (%) | 1.30 | 1.30 | 1.30 | 1.30 | 1.24 | 1.24 | 1.35 | 1.35 | 1.30 | 1.30 | 1.20 | 1.20 |
| Gel Time (sec) | 340 | 346 | 355 | 355 | 350 | 355 | 320 | 325 | 340 | 355 | 350 | 365 |
| Glass transition temperature (° C.) | 182 | 178 | 193 | 192 | 176 | 174 | 183 | 181 | 179 | 183 | 155 | 176 |
| Flame resistance | 94V-0 | 94V-0 | 94V-0 | 94V-0 | 94V-0 | 94V-0 | 94V-0 | 94V-0 | 94V-0 | 94V-0 | 94V-0 | 94V-0 |
| Thermal coefficient of expansion (α1/α2) | 35/208 | 38/213 | 30/198 | 31/201 | 42/233 | 43/235 | 35/222 | 38/229 | 39/223 | 35/221 | 42/238 | 52/255 |
| Water absorption rate (%) | 0.12 | 0.15 | 0.16 | 0.16 | 0.17 | 0.17 | 0.10 | 0.10 | 0.14 | 0.16 | 0.12 | 0.12 |
| Dielectric constant (1 GHz) | 4.01 | 4.06 | 4.05 | 4.05 | 4.14 | 4.15 | 3.91 | 3.95 | 4.09 | 4.11 | 4.25 | 4.21 |
| Dielectric loss (1 GHz) | 0.008 | 0.009 | 0.009 | 0.009 | 0.012 | 0.012 | 0.008 | 0.008 | 0.010 | 0.011 | 0.011 | 0.011 |

CONCLUSION

Comparing the Tg (Table 2) of the cured products obtained in embodiments 11-20 and comparative example 3-4, we can see that the cured phosphor-containing epoxy resin of the present disclosure, especially the cured phosphor-containing epoxy resin prepared by using a hardener obtained by using bisphenol S and phenol as the raw materials (embodiment 3; hardener P-3) and then reacting with epoxy resin, the Tg is higher than the cured phosphor-containing epoxy resin prepared by using phenol (comparative example 1; hardener P-11), and even 13° C. higher than the cured epoxy resin prepared by using bisphenol A based phosphorous-containing hardener (comparative example 2; hardener P-12) and the thermal stability is better than the other embodiments.

From Table 3 we can see the differences in the degree of crosslinking of the phosphorus based hardener and the epoxy resin, wherein in the TGA tests of the bisphenol S based phosphorous-containing epoxy resin hardener (embodiment 3, hardener P-3; embodiment 4; hardener P-4), the thermal cracking (5% weight loss) temperature can exceed 425° C., and can be used as high-end electronic packaging materials.

From Table 4, except embodiment 26 (hardener P-6; phenol+bisphenol F series), we can seen that the Tgs of the other cured phosphor-containing epoxy resins of the present disclosure are all higher than the phosphor-containing hardeners prepared by using only phenol (comparative example 5) or only bisphenol A (comparative example 6), and showed better electrical properties than comparative example 5 and comparative example 6. the cured phosphor-containing epoxy resin containing dicyclopentadiene-phenol resin (embodiment 27) showed that the DK of which can reach 3.91 and the Df can reach 0.008, so that it may be used in the field of high frequency copper-clad laminates, In terms of the performance of the coefficient of expansion, the α1 in embodiments 21-24 and 27-30 are all between 30 and 40, and α2 is between 198 and 229. In embodiment 41-62, as long as a phosphorus content of 1.1-1.4% is in the formulation, the copper-clad laminate can meet the requirement of flame-retarding effect, therefore making it ideal to be used in the field of manufacturing high-end phosphor-containing copper-clad laminate materials.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A phosphor-containing flame retarding phenol-formaldehyde novolac, comprising a compound with the general formula represented by formula (I):

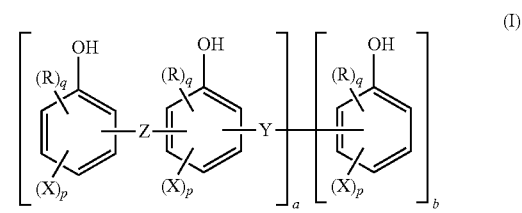

wherein Y is, —$CH_2$— or —$CH_2$—O—$CH_2$—, and Y in different units are the same or different;

Z is

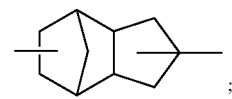

R is H, a C1-C10 alkyl group, a C6-C18 aromatic group,

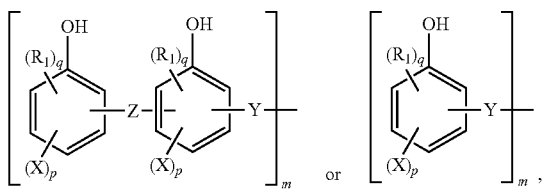

wherein $R_1$ is H, a C1-C10 alkyl group, a C6-C18 aromatic group and $R_1$ in different units are the same or different, and R in different units are the same or different;

p is 1-2; q is 0-3 ; a is an integer greater than or equal to 1; b is an integer greater than or equal to 1;

m is 0-6;

X is

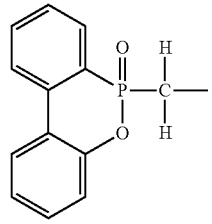

2. The phosphor-containing flame retarding phenol-formaldehyde novolac of claim 1, wherein during the preparation, a phenol compound, a bisphenol compound and a formaldehyde is used to synthesize a phenol-formaldehyde novolac, the phenol-formaldehyde novolac is then mixed with an aromatic phosphate ester to undergo condensation and polymerization to give the phosphor-containing flame retarding phenol-formaldehyde novolac.

3. The phosphor-containing flame retarding phenol-formaldehyde novolac of claim 2, wherein the phenol compound is phenol, o-cresol, m-cresol, p-cresol, o-phenylphenol, m-phenylphenol, p-phenylphenol, 2,6-dimethylphenol, 2,4-dimethylphenol or a combination thereof.

4. The phosphor-containing flame retarding phenol-formaldehyde novolac of claim 2, wherein the bisphenol compound is

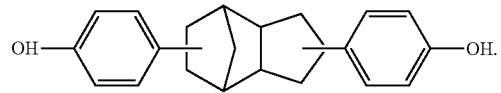

5. The phosphor-containing flame retarding phenol-formaldehyde novolac of claim 2, wherein the aromatic phosphate ester is DOPO (9,10-dihydro-9-oxa-10-phosphaphenanthrene-10-oxide).

6. A cured flame retarding epoxy resin, comprising reacting the phosphorous-containing flame retarding phenol-formaldehyde novolac of claim 1 with an epoxy resin alone under a high temperature, or reacting a mixture comprising of an epoxy resin hardener and the phosphorous-containing flame retarding phenol-formaldehyde novolac of claim 1 with an epoxy resin under a high temperature.

7. The cured flame retarding epoxy resin of claim 6, wherein the weight percent of the phosphor is 0.5% to 10%.

8. The cured flame retarding epoxy resin of claim 6, wherein the epoxy resin hardener is selected from the group consisting of phenol-formaldehyde novolac, cresol-formaldehyde novolac, bisphenol A phenol-formaldehyde novolac, dicyandiamide, methylenedianiline, diaminodiphenyl sulfone, dicyclopentadiene-phenol resin and a combination thereof.

9. The cured flame retarding epoxy resin of claim 6, wherein the epoxy resin is selected from the group consisting of bisphenol A novolac epoxy resin, bisphenol F novolac epoxy resin, bisphenol S novolac epoxy resin, biphenol novolac epoxy resin, phenol novolac epoxy resin, o-cresol novolac epoxy resin, dicyclopentadiene-phenol epoxy resin and a combination thereof.

10. The cured flame retarding epoxy resin of claim 6, wherein the reaction is carried out in the presence of a curing accelerator.

11. The cured flame retarding epoxy resin of claim 10, wherein the curing accelerator is used in a range of 0.01 to 2.5 weight percent of the total weight of the epoxy resin and the epoxy resin hardener.

12. The cured flame retarding epoxy resin of claim 10, wherein the curing accelerator is an imidazole-based compound comprising 2-methylimidazole, 2-phenylimidazole or 2-ethyl-4-methylimidazole.

* * * * *